July 8, 1947.  W. K. EDWARDS  2,423,759
MUD HOOK
Filed March 10, 1947
Fig. 1.
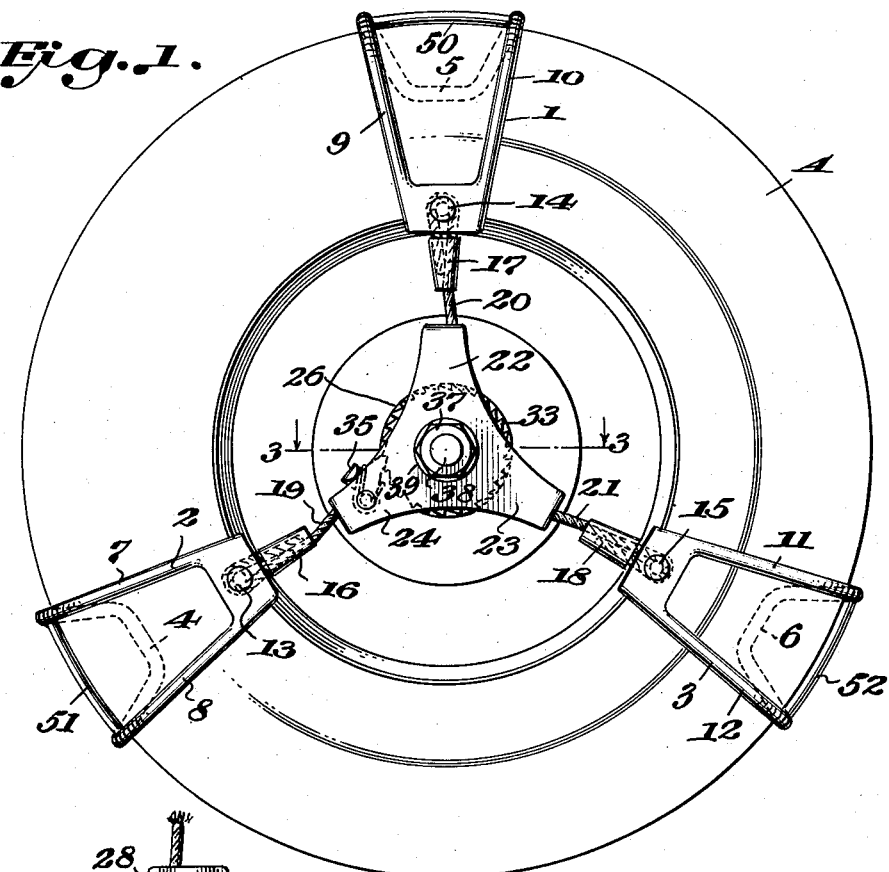
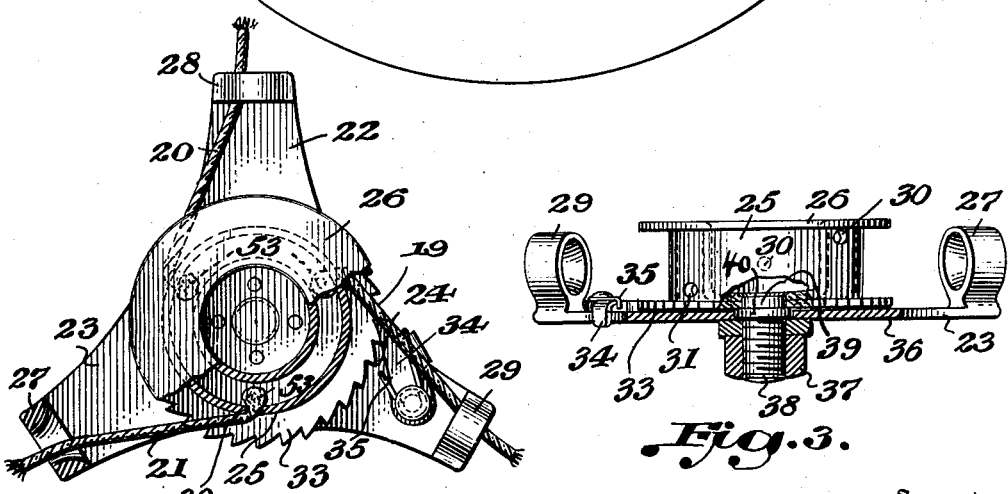
Fig. 2.
Fig. 3.
Inventor
William K. Edwards,
By Mason & Hatfield
Attorneys Patented July 8, 1947

2,423,759

UNITED STATES PATENT OFFICE 2,423,759

MUD HOOK

William K. Edwards, Big Spring, Tex.

Application March 10, 1947, Serial No. 733,669

12 Claims. (Cl. 152—225)

This invention relates to a quickly detachable traction increasing device for automobile tires, for increasing the tractive effect of such tires. Such devices are necessary in order to prevent skidding of said tires on slippery surfaces, due to ice, snow, rain, etc., or when for any reason increased traction is necessary.

An object of the invention is to provide a mud hook that may be immediately applied and which requires only the use of a small wrench or similar tool.

An additional object is to provide a device of this type that is constructed of a minimum number of parts, the principal ones of which may be constructed of sheet metal.

A further object is to provide a tractive increasing device that may be applied, removed and adjusted from one side only of the tire and that requires the removal of none of the tire supporting wheel parts, or the means that positions and supports the wheel on its axle.

An additional object is to provide a traction increasing device, that requires no heavy chains, knee joints, steel arms, levers, boomer links, bellcranks or eye bolts, either for purposes of application or adjustment of the device for different sized tires.

Still another object is to provide a device which includes a plurality of mud hooks or cleats, provided with mechanism for quickly adjusting the cleats in place upon tires of different sizes whereby said hooks may be quickly adjusted by a single operation.

Other objects will appear hereinafter throughout the specification.

In the drawings:

Figure 1 is a side elevation of a device embodying the invention,

Figure 2 is an enlarged rear elevation of the hook adjusting means, with parts broken away, and Figure 3 is a view of the adjusting means taken on the line 3—3 of Figure 1.

The hooks, cleats or shoes 1, 2 and 3 may be of various shapes or sizes, but these hooks are preferably constructed as shown in the drawings. Hook 1 has diverging shanks 9 and 10 on the outside of the tire which becomes U-shaped portion 5 on the inside of the tire; hook 2 has diverging shanks 7 and 8 which become U-shaped portion 4; and hook 3 has diverging shanks 11 and 12 which become U-shaped portion 6. The said diverging shanks, where they extend over the tread portion of the tire, are connected by webs 50, 51 or 52.

The bases of the hooks 1, 2 and 3 are provided with bolts or studs 13, 14 and 15. These are headed on both ends so as to hold securely the looped ends of the cables 19, 20 and 21. The cables are preferably made of twisted wire strands, as shown. The looped ends of the cables are held in proper position by clips or clamps 16, 17 and 18.

A spider is provided with a plurality of arms 22, 23, 24 having guides 28, 27, 29, respectively for guiding the several cables toward a drum 25, provided with a side flange 26. The drum has a series of offset perforations through which the ends of the cables are threaded. These ends are held in the position shown in Figure 2, by suitable means such as by welding.

The spider is provided with a central aperture, preferably of circular shape for the reception of the collar 40 of the bolt 38, in order that the bolt may rotate therein. The bolt has a square portion 39 for the reception of a correspondingly shaped aperture in flange 33 of the drum 25.

The nut 37 is threaded on bolt 38 and is fixed with relation to said nut by its engagement with the collar 40 or the interposed washer shown in Figure 3.

Flange 33 is part of drum 25 and is provided on its periphery with a series of inclined teeth that are engageable by the spring pressed pawl 34 mounted on arm 24 of the spider as shown in Figure 2.

When it is desired to apply the device to a tire, the pawl 34 is removed from the teeth of flange 33, and the cables 19, 20 and 21 are paid out by rotation of the drum in a counterclockwise direction as seen in Figure 2. The hooks are applied over the sides of the tire. The nut 37 is engaged by a suitable wrench, such as a lug wrench and rotated in a clockwise direction as viewed in Figure 1. Rotation of the nut carries with it the drum 25, thus simultaneously winding all of the cables 19, 20 and 21 until all slack has been taken up. The cables are held in their wound position by the engagement of the pawl 34 with the teeth of flange 33 that is part of the drum.

The device may easily be removed by merely removing the pawl from the teeth, and permitting the drum to rotate in a reverse direction, after which the hooks are removed from the tire.

It is to be understood that this invention is not to be limited to the number of arms used (such as 22, 23 or 24). Three or more of such arms and their corresponding cables and mud hooks may be provided. Other means for fastening both ends of the cable than that shown may be used, and of attaching the bolt to the drum. The embodiment disclosed, therefore, is illustrative and may be variously modified and departed from without departing from the spirit and scope of the invention as pointed out in and limited only by the appended claims.

What I claim is:

1. A traction lug assembly for a vehicle wheel comprising a series of lugs adapted to engage a vehicle tire at spaced places about its periphery, a spider, a drum rotatably mounted on said spider and a series of flexible members, each of said members having one of its ends attached to said drum and its opposite end attached to one of said series of lugs, and means for preventing rotation of said drum in one direction.

2. A traction lug assembly for a vehicle wheel comprising a series of lugs adapted to engage a vehicle tire at spaced places about its periphery, a spider, a drum rotatably mounted on said spider and a series of flexible members, each of said members having one of its ends attached to said drum and its opposite end attached to one of said series of lugs, and means for preventing rotation of said drum in one direction, said means comprising a pawl and ratchet connection between said spider and said drum.

3. A traction lug assembly for a vehicle wheel comprising a series of lugs adapted to engage a vehicle tire at spaced places about its periphery, a spider, a drum rotatably mounted on said spider and a series of flexible members, each of said members having one of its ends attached to said drum and its opposite end attached to one of said series of lugs, means for preventing rotation of said drum in one direction, a nut, and means fixing said nut to said drum.

4. A traction lug assembly for a vehicle wheel comprising a series of lugs adapted to engage a vehicle tire at spaced places about its periphery, a spider, a drum rotatably mounted on said spider and a series of flexible members, each of said members having one of its ends attached to said drum and its opposite end attached to one of said series of lugs, means for preventing rotation of said drum in one direction, and means on said drum for rotating the same.

5. A traction lug assembly for a vehicle wheel comprising a series of lugs adapted to engage a vehicle tire at spaced places about its periphery, a spider, a drum rotatably mounted on said spider and a series of flexible members, each of said members having one of its ends attached to said drum and its opposite end attached to one of said series of lugs, and means for preventing rotation of said drum in one direction, said means including a series of ratchet teeth on said drum and a pawl on said spider.

6. A mud hook assembly comprising a series of hooks adapted to be placed about an automobile tire, a drum, means for mounting said drum, and a series of flexible cables corresponding in number to said hooks, means attaching said cables to said hooks and said drum, and means on said drum for rotating the same.

7. A mud hook assembly comprising a series of hooks adapted to be placed about an automobile tire, a drum, means for mounting said drum and a series of flexible cables corresponding in number to said hooks, means attaching said cables to said hooks and said drum, means on said drum for rotating the same, said drum mounting means comprising a series of arms, and a guide at the end of each drum for guiding one of said cables.

8. A mud hook assembly comprising a series of hooks adapted to be placed about an automobile tire, a drum, means for mounting said drum, and a series of flexible cables corresponding in number to said hooks, means attaching said cables to said hooks and said drum, means on said drum for rotating the same, said drum having a periphery and a series of offset apertures in said periphery for the reception of the ends of said cables.

9. A mud hook assembly comprising a series of hooks adapted to be placed about an automobile tire, a drum, means for mounting said drum and a series of flexible cables corresponding in number to said hooks, means attaching said cables to said hooks and said drum, means on said drum for rotating the same, said drum mounting means comprising a series of arms, a guide at the end of each drum for guiding one of said cables, said drum rotating means including a multi-sided aperture, and a bolt provided with an exterior portion adapted to fit said aperture.

10. A mud hook assembly comprising a series of hooks adapted to be placed about an automobile tire, a drum, means for mounting said drum and a series of flexible cables corresponding in number to said hooks, means attaching said cables to said hooks and said drum, means on said drum for rotating the same, said drum mounting means comprising a series of arms, a guide at the end of each drum for guiding one of said cables, said drum rotating means including a multi-sided aperture, and a bolt provided with an exterior portion adapted to fit said aperture, said drum having a flange provided with teeth and a pawl on said drum mounting means adapted to engage said teeth.

11. A traction lug assmbly for a vehicle wheel comprising a series of lugs adapted to engage a vehicle tire at spaced places about its periphery, a spider, a drum rotatably mounted on said spider and a series of flexible members, each of said members having one of its ends attached to said drum and its opposite end attached to one of said series of lugs, means for preventing rotation of said drum in one direction, a nut, and means fixing said nut to said drum, said nut having a cylindrical collar and said spider having a cylindrical aperture in which said collar turns.

12. A traction lug assembly for a vehicle wheel comprising a series of lugs adapted to engage a vehicle tire at spaced places about its periphery, a spider, a drum rotatably mounted on said spider and a series of flexible members, each of said members having one of its ends attached to said drum and its opposite end attached to one of said series of lugs, means for preventing rotation of said drum in one direction, a nut, and means fixing said nut to said drum, said nut having a cylindrical collar and said spider having a cylindrical aperture in which said collar turns, and said nut fixing means having a multi-sided portion next to said collar and said drum having a correspondingly multi-sided portion engaging the said multi-sided portion of said nut fixing means.

WILLIAM K. EDWARDS.